United States Patent [19]

Mathieu et al.

[11] Patent Number: 5,246,724
[45] Date of Patent: Sep. 21, 1993

[54] PROCESS FOR MANUFACTURING VITAL WHEAT GLUTEN WITH SUBSTANTIALLY NO OBJECTIONAL FLAVOR OR AROMA

[75] Inventors: Jean-Jacques Mathieu, Chambly, Canada; Akira Takehara, Chiba, Japan

[73] Assignee: ADM Agri-Industries, Ltd., Canada

[21] Appl. No.: 2,092

[22] Filed: Jan. 8, 1993

Related U.S. Application Data

[63] Continuation of Ser. No. 694,067, May 1, 1991, abandoned.

[51] Int. Cl.⁵ ............................................. A23J 1/12
[52] U.S. Cl. .................................... 426/549; 426/541; 426/555; 426/622
[58] Field of Search ................. 426/549, 541, 73, 555, 426/622

[56] References Cited

U.S. PATENT DOCUMENTS

| | | | |
|---|---|---|---|
| 3,880,824 | 4/1975 | Rao | 426/618 |
| 4,076,845 | 2/1978 | Johannson | 426/656 |
| 4,150,016 | 4/1979 | Johannson | 426/656 |
| 4,198,438 | 4/1980 | Singer | 426/656 |
| 4,305,971 | 12/1981 | Stone | 426/549 |
| 4,481,222 | 11/1984 | Fan | 426/555 |
| 4,847,108 | 7/1989 | Inoue | 426/549 |
| 4,871,577 | 10/1989 | Endo | 426/656 |
| 4,935,257 | 6/1990 | Yajima | 426/73 |
| 4,961,937 | 10/1990 | Reidel | 426/555 |
| 5,061,508 | 10/1991 | Schur | 426/523 |

FOREIGN PATENT DOCUMENTS

| | | | |
|---|---|---|---|
| 0134658 | 3/1985 | European Pat. Off. | 426/549 |
| 55-131340 | 10/1980 | Japan | 426/549 |
| 63-291687 | 11/1988 | Japan | 426/541 |

Primary Examiner—Carolyn Paden
Attorney, Agent, or Firm—Laff, Whitesel, Conte & Saret

[57] ABSTRACT

A process for manufacturing vital wheat gluten with substantially no objectionable flavor or aroma includes extracting gluten from wheat or wheat flour in an aqueous process to provide vital wet gum wheat gluten which is then mixed with an aqueous preparation containing an amount of antioxidant effective to prevent production of an objectionable flavor or aroma in a subsequent drying step. The aqueous antioxidant/gluten mixture is dried to produce dried vital wheat gluten with substantially no objectionable flavor or aroma.

12 Claims, 2 Drawing Sheets

PRIOR ART SAMPLE
NO TOCOPHEROL ADDED

INVENTION SAMPLE
WITH TOCOPHEROL ADDED

PROCESS FOR MANUFACTURING VITAL WHEAT GLUTEN WITH SUBSTANTIALLY NO OBJECTIONAL FLAVOR OR AROMA

This application is a continuation, of application Ser. No. 07/694,067, filed May 1, 1991 which is now abandoned.

BACKGROUND OF THE INVENTION

1. Field of the Invention

This invention relates to the manufacture of vital wheat gluten with substantially no objectionable flavor or aroma and thus suitable for use in various food products, which may also contain meat, poultry or dairy analogues.

2. Description of the Related Art

Vital wheat gluten, often simply called wheat gluten, is a vegetable protein product extracted by aqueous processes from wheat or wheat flour. Various gluten extraction processes are described for example in U.S. Pat. Nos. 2,797,212 (Miley et al.), 3,463,770 (Fellers), 3,493,384 (Fellers), 3,498,965 (Fellers), 3,501,451 (Fellers), 3,574,180 (Johnston et al.), 4,486,342 (Bateson et al.) and 4,494,530 (Jansma et al.). The contents of these patents are hereby incorporated herein by reference.

Commercially available vital wheat gluten has the following typical composition (by weight):

| | |
|---|---|
| Moisture | 5 to 8% |
| Protein, % N*5.7, dry basis | 75 to 81% |
| Free Lipids, dry basis | 0.3 to 2.5% |
| Total lipids, by acid hydrolysis | 5 to 9% |
| Ash, dry basis | 0.5 to 1.5% |

The bread-baking properties of wheat flour are mainly due to the unique visco-elastic properties of its gluten protein. In order to preserve these properties, the processing conditions, especially temperature, are critical.

Vital wheat gluten can be spray dried as in U.S. Pat. No. 2,891,045 (Montgomery et al.), or drum dried as in U.S. Pat. No. 2,567,980 (Tuomy et al.), but most commercially produced vital wheat glutens are flash dried, for example in a process such as that described in U.S. Pat. No. 2,559,551 (Weber). The contents of these patents are hereby incorporated herein by reference.

Flash drying produces a dry powdered gluten suitable for typical gluten uses such as in bread-baking where the gluten is added to strengthen low protein flours or flour doughs which contain added fibre, protein, grains or other product which dilute and weaken the functional native wheat flour protein. Gluten is also used in the preparation of restructured pet food products, such as described in Canadian patent 910115.

Vital wheat gluten is also formulated into pasta and breakfast cereals to improve their nutritional profile, and is added to shrimp feed formulations not only as a source of high quality protein but also in order to impart water stability properties to the feed products.

The heat setting properties of vital wheat gluten are also utilized in the preparation of meat analogues and in the extension of meat, poultry, dairy and surimi based products.

Freshly extracted wet gum gluten has a solids content of from about 30 to about 40%. It is then normally dried in a ring drier, which is a flash dryer of the kind as described for example in U.S. Pat. No. 2,559,551 (Weber) mentioned above. The ring drying process involves extruding wet gum gluten through a disintegrator into a recycling current of dry gluten and hot air. The recycling gluten prevents reagglomeration and promotes disintegration.

Unfortunately, the conditions in this known drying process are also conducive to the initiation of rancidity, since drying temperatures up to about 155° C. are used. Vital wheat gluten contains a certain proportion of lipids, typically from about 5 to about 9% on a dry basis, and these will oxidize readily at such high temperatures, especially in the presence of oxygen. The commercially available gluten currently being ring dried consequently has a rancid "wheaty" or "cereal" flavor and aroma.

Thus, the cereal flavor and aroma of such wheat gluten limits its addition or substitution level and often requires some reformulation in order to mask the foreign "wheaty" or "cereal" flavor.

Other vegetable protein products also have off-flavors. For example, U.S. Pat. No. 4,265,925 (Campbell et al.) describes a solvent process to improve the flavor (referred to as being "beany" or "painty") of soy protein products. Campbell et al. propose an aqueous alcohol solution to extract the flavor and the soluble carbohydrate components of defatted vegetable protein flakes.

U.S. Pat. No. 4,075,361 (Oberg) teaches hot alkaline water extraction of whole soybean in order to deactivate the lipoxygenase enzyme responsible for the "painty" soy flavor.

U.S. Pat. No. 4,108,847 (Creinin) describes a process for preparing a bland corn gluten product. This process would not be suitable for the preparation of a bland vital wheat gluten product since in a critical step the protein slurry is heated to about 90°–100° C. This heating step would denature vital wheat gluten proteins, making it unsuitable for many important traditional uses, for example the manufacture of a wheat gluten based fibrous meat-like product, such as described in U.S. Pat. No. 4,938,976 (Shemer), or the fabrication of a simulated meat pet food product such as described in Canadian patent 910115.

U.S. Pat. No. 4,396,637 ((Singer) teaches a method for processing and drying a vital wheat gluten having improved flavor and odor but without any denaturation of the protein. The vital wheat gluten extracted from wheat or wheat flour in a conventional manner is dispersed in a hydrophobic phase and dried under reduced pressure. However, considerable capital expenditure would be required to substitute such a drying process for the conventional flash drying process. Also, the resulting product would differ from conventional vital wheat gluten in that its composition would be changed from having about 15% to having about 50% carrier oil. Removing this oil component would require additional expensive steps, such as solvent extraction and steam stripping.

U.S. Pat. No. 4,645,831 (Lawhon) describes a process for improving the flavor and the color of wheat gluten products. The gluten or gluten products are dispersed in an alkaline water solvent phase and then extracted. The extracted protein concentrate is re-dispersed in a suitable solvent and further purified by ultra-filtration. This process would add a series of additional complex steps to the process of starch and gluten separation, namely the dispersion in an alkaline aqueous solvent phase, the recovery of the solvent and the ultra-filtration. Also, the extra equipment needed for the ultra-filtration and the solvent recovery systems would require large capital expenditures.

Thus, although there has been a need for vital wheat gluten with substantially no objectionable flavor or aroma for many years, and various attempts have been made to provide a suitable process for producing such gluten, the only processes so far proposed require the addition or substitution of expensive steps in conventional gluten producing processes.

There is therefore still and has for a long time been a need for a simple and inexpensive modification to conventional gluten producing processes which include drying wet gum gluten to enable dried vital wheat gluten to be produced with substantially no objectionable flavor or aroma.

SUMMARY OF THE INVENTION

It has now been discovered that this can be achieved by mixing an aqueous antioxidant preparation with vital wet gum gluten after its extraction from wheat or wheat flour by an aqueous process and prior to its being dried to produce dried vital wheat gluten. The mixing of the aqueous antioxidant preparation and vital wet gum gluten is both technically easy and also inexpensive, requiring minimal change to existing gluten production plants. The cost of the aqueous antioxidant preparation is also relatively inexpensive compared to the beneficial result obtained.

Advantageously, the antioxidant comprises tocopherol, the antioxidant preparation comprising an aqueous tocopherol dispersion. The antioxidant may be delta tocopherol, gamma tocopherol, beta tocopherol or mixtures of two or more thereof. Alpha tocopherol may also be used, either by itself or mixed with one or more of the other tocopherols mentioned. The tocopherol or tocopherol mixture is preferably present in an amount in the range of from about 20 to about 2,000, still more preferably from about 80 to about 240, parts per million by weight of the dried vital wheat gluten product.

Use of the invention produces a bland but functional gluten product that can be used to bind and extend meat, poultry, surimi based and dairy products and to prepare meat, poultry and dairy analogues.

The vital wheat gluten produced by utilization of this invention has all of the very desirable properties of regular vital wheat gluten but is also very bland in flavor and aroma and is thus a suitable ingredient for the extension of food protein products.

In order to achieve an efficient dispersion of the antioxidant in the wet gluten phase, it is important to introduce it at a suitable concentration. Too high concentration makes homogeneous mixing difficult, while using a too dilute antioxidant dispersion will result in having to dry out more water with consequent reduced drying throughput. For a tocopherol dispersion for example, a suitable concentration would be in the range of from about 0.005 to about 5%, typically about 0.5%, by weight.

It should be noted that the present invention is not suggested in U.S. Pat. No. 4,238,515 (Shemer) which describes a process for producing a novel physical form of gluten containing an inert food material bound within its matrix. The Shemer process comprises agitating mixture consisting essentially of hydrated vital wheat gluten and a reducing agent at a temperature below 70° C. to form a softened net-like fibrous structure, and incorporating during said agitation the solid inert food material having particle size below 5 cm diameter in an amount sufficient to obtain a ratio of gluten to inert food material of from about 1:0.1 to 1:10. Shemer suggests that tocopherol may be used as the reducing agent, but gives only specific examples of sodium sulfate and ascorbic acid as reducing agents. Shemer is not concerned with the flavor and aroma of gluten produced by drying wet gum gluten as is the case in the present invention.

Reference should also be made to the article entitled "Tocopherols As Food Antioxidants" by Marion E. Dougherty, Jr. in Cereal Foods World, February 1988, Volume 33 No. 2, pages 222-3. Although this article indicates that tocopherols are well known as antioxidants for finished food products, it was completely unexpected that tocopherols would function as an antioxidant for gluten when added during the manufacture thereof as in the present invention. As mentioned above, the problem of producing vital wheat gluten with substantially no objectionable flavour or aroma has awaited a satisfactory solution for many years.

BRIEF DESCRIPTION OF THE DRAWINGS

Embodiments of the invention will now be described, by way of example, with reference to the accompanying drawings, of which.

Figure 1:
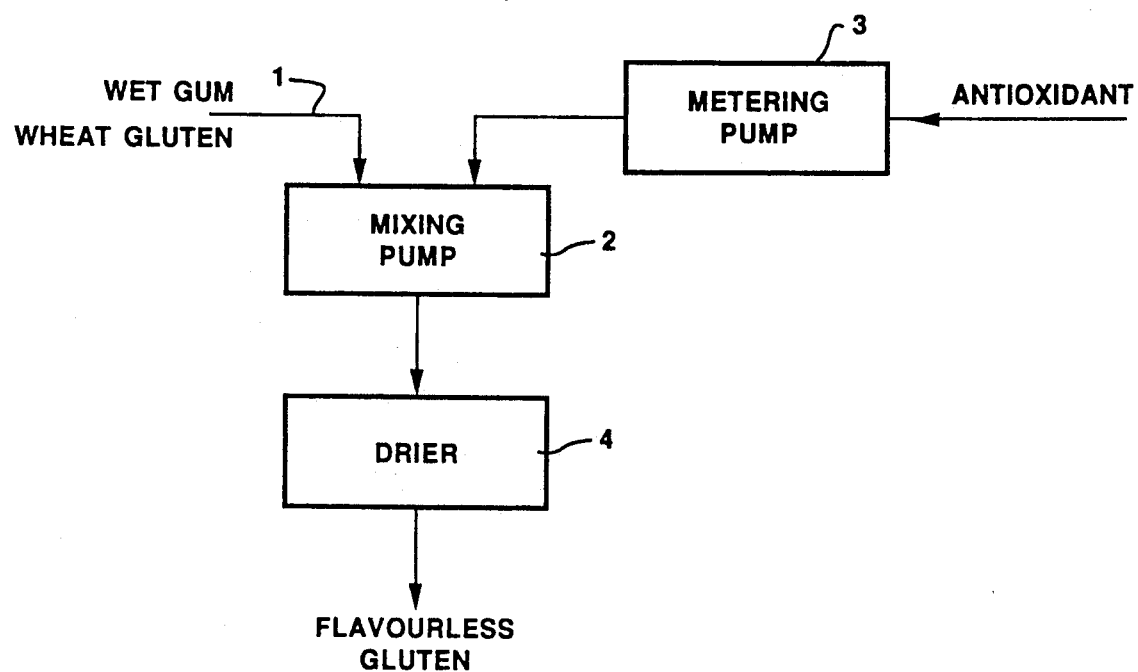
FIG. 1 is a flow diagram of a gluten production process incorporating the use of an antioxidant preparation in accordance with the present invention.

Referring first to FIG. 1, freshly extracted vital wet gum wheat gluten is received from a conventional extraction process through pipe 1 and falls into the inlet of pump 2, which is an auger-fed positive displacement pump. An emulsion dispersion prepared by dispersing a dispersible antioxidant product in cold water is fed through a metering pump 3 also into the inlet of pump 2. Pump 2 mixes and pumps the gluten/antioxidant mixture into conventional drier 4 from which flavourless gluten product is subsequently extracted.

Figure 2:
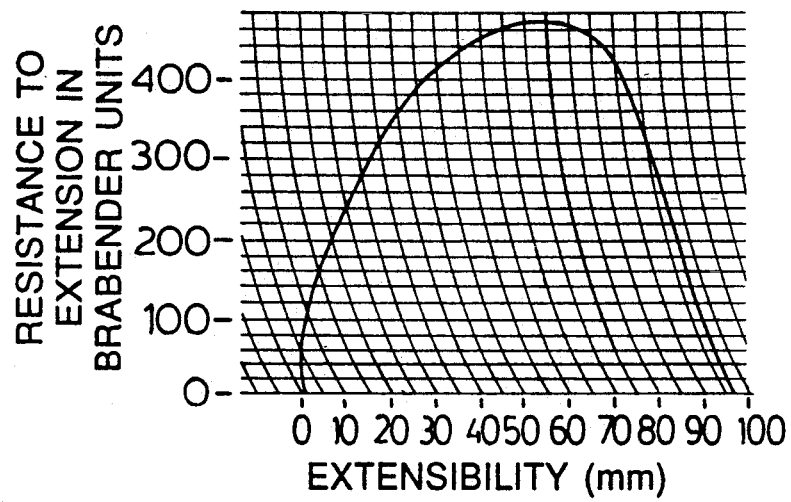
FIGS. 2 and 3 are graphs comparing the rheology of gluten produced in accordance with the prior art and gluten produced in the same manner but with the use of an antioxidant preparation in accordance with the present invention.
Figure 3:
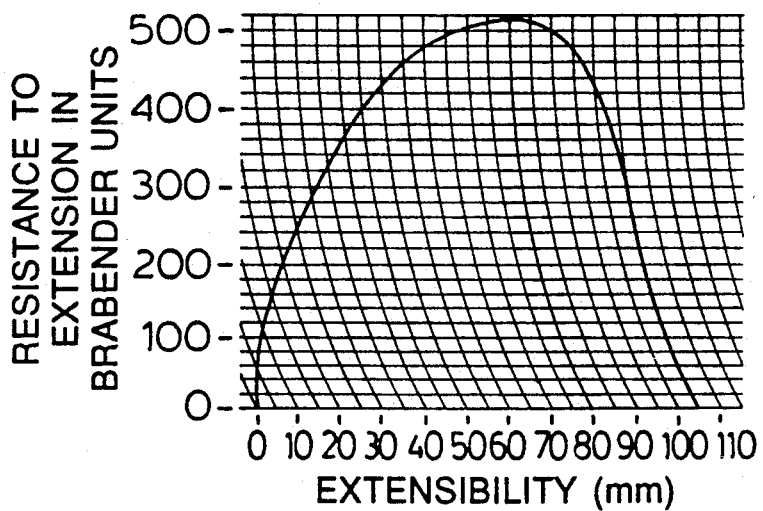

FIGS. 2 and 3 show the results of Brabender Extensograph tests carried out on gluten produced in accordance with the prior art and gluten produced in the same manner but with use of an antioxidant preparation in accordance with the present invention (as described in the following example).

In a Brabender Extensograph test, a reconstituted gluten dough is formed and stretched, and elongation and resistance to elongation are recorded. In FIGS. 2 and 3, the horizontal axis indicates elongation and the vertical axis indicates resistance to elongation.

These tests demonstrate the unique visco-elastic properties of vital wheat gluten, and a comparison of FIGS. 2 and 3 shows that these critical gluten properties have not been affected by use of the invention.

DESCRIPTION OF A PREFERRED EMBODIMENT

A specific example of the invention will now be described.

EXAMPLE 15 kg of a suitable antioxidant mixture, such as Emulsion 14-SP produced by Riken Vitamin Co. Ltd. of Tokyo, Japan, which contains about 14% active tocopherols, was dispersed into 400 liters of cold water in a 2,000 liter tank, and the mixture was stirred for five minutes in order to ensure complete dispersion. The dispersion thus contains about 0.5% by weight active tocopherols. This dispersion was then pumped at the rate of 350 mls per minute into a pump which was also pumping wet gum vital wheat gluten at a rate of 32 to 37 kg per minute. The resultant gluten tocopherol mixture was then pumped through a stainless steel pipe to a conventional ring drier, with an inlet temperature of 155° C. and an outlet temperature of 55° C.

The resulting dry gluten was bland and devoid of any objectionable flavor or aroma and yet still had all the functionalities usually associated with commercially dried vital wheat gluten.

Analyses of a control gluten with no added tocopherol and gluten produced in accordance with the invention with added tocopherol are shown in Table 1.

TABLE 1

| TOCOPHEROL CONTENT OF GLUTEN (per 100 g of gluten) | | |
|---|---|---|
| Control Gluten (no added tocopherol) | Alpha Tocopherol | 1.80 mg |
| | Delta Tocopherol | 0.40 mg |
| | Gamma and Beta Tocopherol | 1.20 mg |
| Invention Gluten (with added tocopherol) | Alpha Tocopherol | 1.90 mg |
| | Delta Tocopherol | 6.50 mg |
| | Gamma and Beta Tocopherol | 14.30 mg |

Thus, the invention gluten contains about 190 parts per million added tocopherols by weight of the gluten.

It will be noted that gluten normally contains a lower amount of different forms of tocopherol, such a low amount being insufficient to prevent the production of objectionable flavor and aroma in the conventional drying step.

Other embodiments and examples of the invention will be readily apparent to a person skilled in the art from the foregoing description, the scope of the invention being defined in the appended claims.

We claim:

1. A process for manufacturing vital wheat gluten with substantially no objectionable flavor or aroma comprising extracting gluten from wheat or wheat flour in an aqueous process to provide vital wet gum wheat gluten, mixing with the vital wet gum gluten an aqueous preparation containing an amount of antioxidant effective to prevent production of an objectionable flavor or aroma in a subsequent drying step, and drying the aqueous antioxidant/gluten mixture to produce dried vital wheat gluten with substantially no objectionable flavor or aroma.

2. A process according to claim 1 wherein the antioxidant comprises tocopherol, said aqueous preparation comprising an aqueous tocopherol dispersion.

3. A process according to claim 2 wherein the antioxidant is selected from the group consisting of delta tocopherol, gamma tocopherol, beta tocopherol and mixtures of two or more thereof.

4. A process according to claim 3 wherein the tocopherol or tocopherol mixture is present in an amount in the range of from about 20 to about 2,000 parts per million by weight of the dried vital wheat gluten product.

5. A process according to claim 4 wherein the tocopherol or tocopherol mixture is present in an amount in the range of from about 80 to about 240 parts per million by weight of the dried vital wheat gluten product.

6. Dried vital wheat gluten manufactured in accordance with the process claimed in claim 5.

7. Dried vital wheat gluten manufactured in accordance with the process claimed in claim 4.

8. Dried vital wheat gluten manufactured in accordance with the process claimed in claim 3.

9. A process according to claim 2 wherein the aqueous tocopherol dispersion contains from about 0.005 to about 5% by weight of the tocopherol or tocopherol mixture.

10. Dried vital wheat gluten manufactured in accordance with the process claimed in claim 9.

11. Dried vital wheat gluten manufactured in accordance with the process claimed in claim 2.

12. Dried vital wheat gluten manufactured in accordance with the process claimed in claim 1.

* * * * *